UNITED STATES PATENT OFFICE.

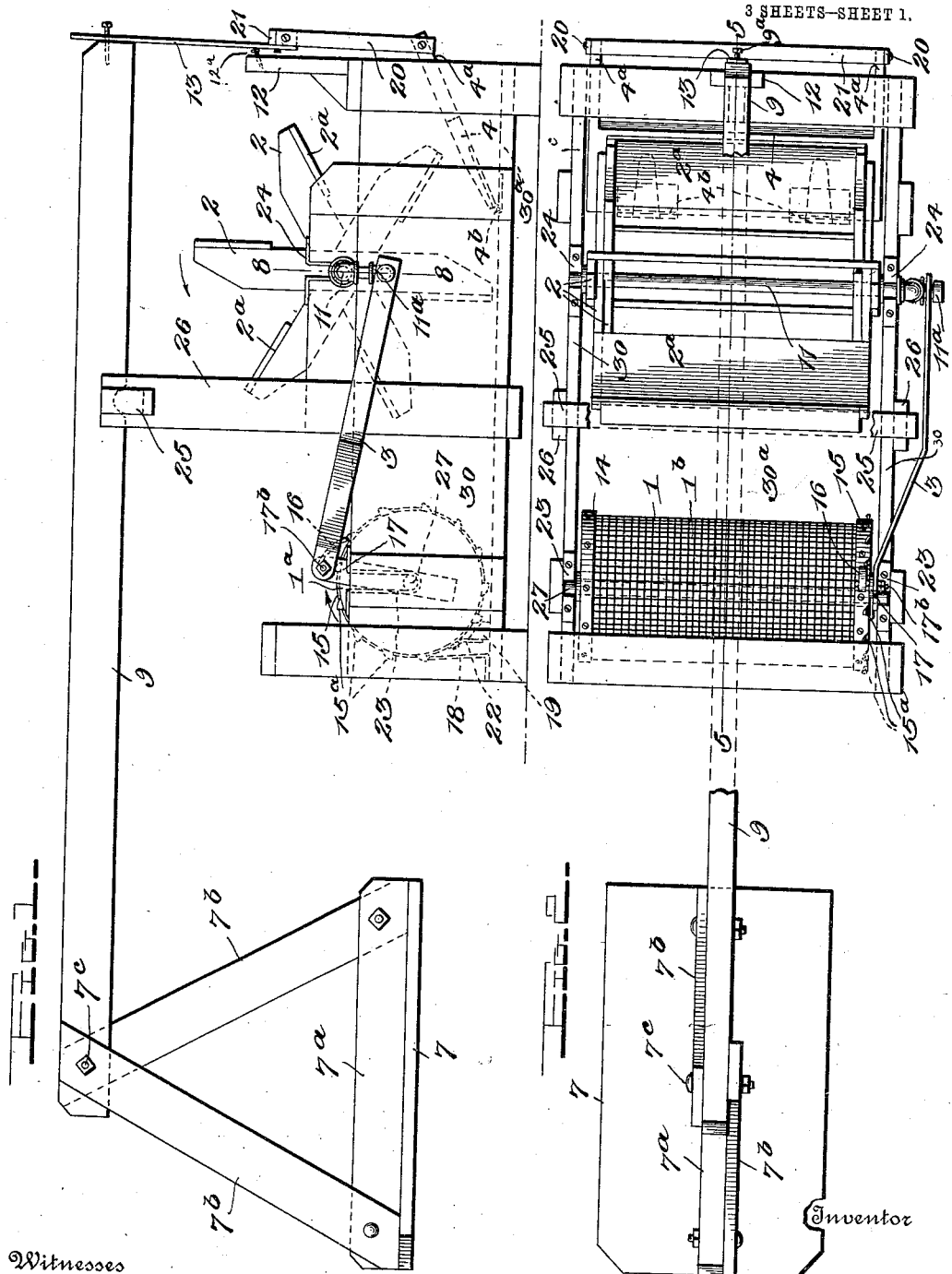

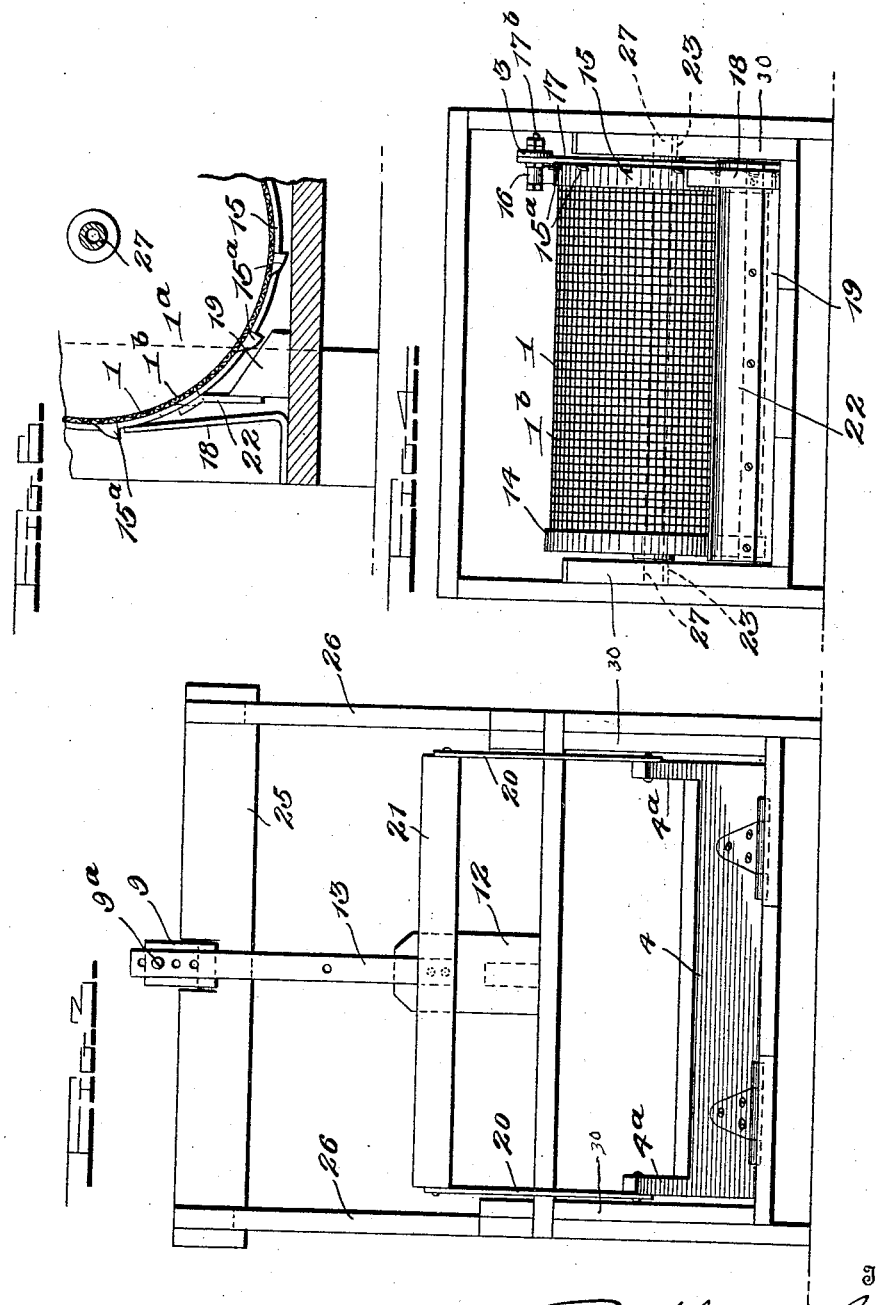

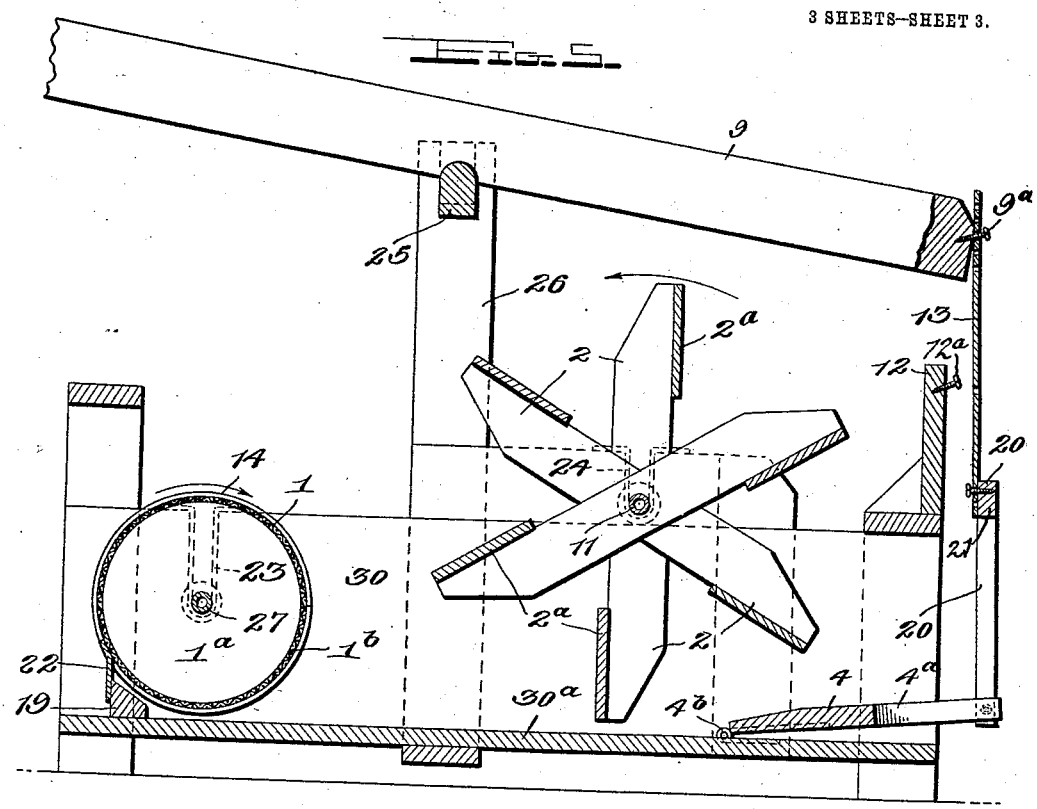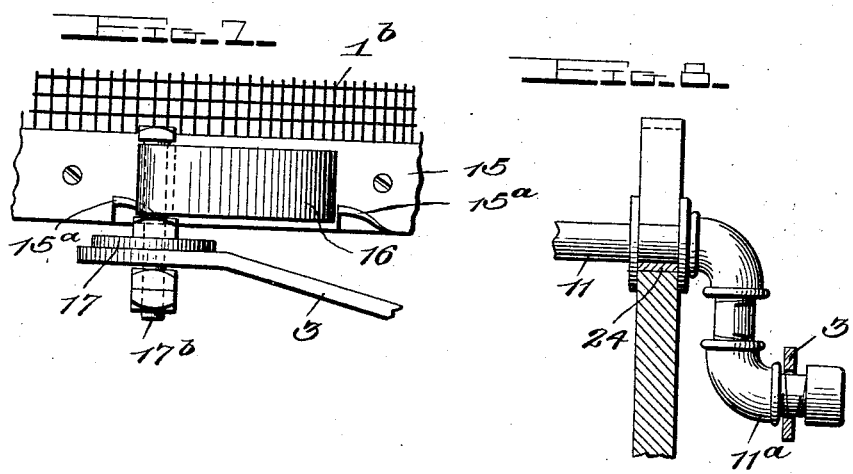

RALPH WALDO REQUA, OF CHICO, CALIFORNIA.

FISH-SCREEN.

1,065,724.  Specification of Letters Patent.  Patented June 24, 1913.

Application filed December 23, 1912. Serial No. 738,252.

*To all whom it may concern:*

Be it known that I, RALPH W. REQUA, of Chico, in the county of Butte and State of California, have invented certain new and useful Improvements in Fish-Screens; and I hereby declare that the following is a full, clear, and exact description thereof, reference being had to the accompanying drawings, which form part of this specification.

This invention is a fish screen; and its primary object is to provide a fish screen of simple construction whereby leaves and light flotage matters may be passed over the screen into a sluice or runway while fish will be kept from passing thereinto.

A further object of the invention is to provide novel means for rotating the cylindric screen which is employed in my invention; a still further object is to provide novel means for maintaining the mean water level at the face of the screen under variable heads of water.

A further object is to so construct the apparatus that it may be made cheaply, and its parts assembled or removed without requiring special tools.

Another object of the invention is to so construct the screen that any or all of the moving or power members can be removed for repair and replaced without shutting off the flow of water.

One practical embodiment of the invention is illustrated in the accompanying drawings and I will explain the invention in detail as embodied in such apparatus, and summarize in the claims the essentials of the invention and novel features and combinations thereof for which protection is desired.

In said drawings—Figure 1 is a side elevation of the complete apparatus. Fig. 2 is a plan view thereof partly broken. Fig. 3 is a tail-end elevation thereof. Fig. 4 is a front end elevation thereof. Fig. 5 is an enlarged longitudinal vertical sectional view on line 5—5, Fig. 2. Fig. 6 is an enlarged detail sectional view of part of the screen. Fig. 7 is a detail view of the screen operating ratchet. Fig. 8 is a detail showing a simple construction of the crank on the water wheel shaft.

As shown the apparatus comprises a rotatable cylindric screen 1, which is composed of heads 1ª secured to a shaft 27 and to these heads is attached a screen 1ᵇ preferably of wire netting, which may be secured to the heads by means of metal straps 14 and 15 as indicated in the drawings. The shaft 27 projects through the heads of the screen and is supported or journaled in slots, formed in the sides 30 of a chute in which the operative parts of the apparatus are mounted, and which chute may be formed of wooden or metal sides 30 and bottom 30ª and may be placed at a point where the water is to be taken from a stream into a sluiceway or drainage canal.

Pivoted upon the shaft 27, adjacent that end of the screen to which the band 15 is applied, is an oscillatory lever 17 to the upper end of which is attached a stud bolt 17ᵇ, secured thereto by suitable nuts, as indicated in Fig. 7; and on this bolt is pivoted a pawl 16 which is adapted to engage with a ratchet on the adjacent end of the screen cylinder; which ratchet may be cheaply formed by notching the strap 15 and turning up one side of the notched portions, thus forming ratchet teeth 15ª as indicated in Fig. 7. To the bolt 17ᵇ is also pivotally connected one end of a pitman 3, which may be formed of strap metal, the other end of which is connected to a crank 11ª on one end of the water wheel shaft 11 which is journaled in slots in the sides 30 of the chute above the plane of the shaft 27. The slots in which the shafts 27 and 11 are journaled may be protected by metal straps 23 and 24 indicated in the drawings. On the shaft 11 is secured a water wheel consisting of arms 2 fast to the shaft and blades 2ª secured to the outer ends of said arms so that said water wheel will be operated by the water flowing through the screen and chute, and will rotate in the direction indicated by the arrows in the drawings.

The pawl 16 and ratchet 15ª are so related that on the stroke of the pitman 3 toward the screen cylinder 1, the pawl will ride over the ratchet teeth; and on the movement of the pitman away from the screen cylinder 1 the pawl will engage the ratchet teeth and rotate the screen cylinder clockwise in a direction contrary to the rotative movement of the water wheel, see Figs. 1 and 5. In the chute, in rear of the water wheel, is an adjustable gate or tail piece 4, which may be hinged to the floor 30ª by ordinary hinges, indicated at 4ᵇ. This gate has arms 4ª at its ends which are connected by straps, or bars, 20 to the ends of a cross bar 21 which in turn is connected by a strap or rod 13 to the rear end of a lever 9, which is pivotally mounted upon a cross bar 25 attached to uprights 26 at the sides of the chute, so as to support the bar 9 above the water wheel and screen. The bar 9 extends beyond the front face of the screen cylinder, and its outer end is connected to a float 7, which may be constructed of wood and have a transverse rib 7ª, the opposite ends of which are connected to angle pieces 7ᵇ, the upper ends of which are loosely attached to the end of the bar 9 by a bolt 7ᶜ, or in other suitable manner. The strap 13 may be provided with a series of holes, see Fig. 5, any one of which may be engaged with a screw 9ª, or other device, on the end of the bar 9, so as to regulate the position assumed by the tail piece or gate 4 under control of the float 7.

The passage of material under the screen may be prevented by a guard 22 of leather or other suitable material attached to a cross piece 19 at the front of the chute at the outer side of the screen as shown; and the backward rotation of the screen may be prevented by a dogging strap 18, shown in Figs. 1 and 4.

Operation: The motion or rotation of the screen drum 1 is suspended during the forward stroke of the strap 3; while on the backward stroke of this strap the drum is rotated in a direction opposite to that of the wheel 2. The screen rotating, intermittently, at a lower speed than the wheel, the relative speed may be varied at will by varying the length of the crank. The object of having the screen rotate intermittently is to permit any fish that may have been carried up on the screen during its period of rotation to escape back into the water. The hinged tail piece 4 and the float are so constructed that when an increase in the flow of water at the face of the screen cylinder causes the float to rise, the tail piece will lower, which enlarges the clearance space back of the wheel 2 and increases the speed of the wheel and accommodates the larger volume of water. A decrease in the volume of water delivered to the face of the screen cylinder causes the float to lower, which raises the hinged tail piece 4, and holds or retains the water level in the chute at about the center of the screen cylinder. By this automatic action of the float and tail gate all leaves, grasses, or other floating debris deposited on the face of the drum will be above the center of the same, which permits the cylinder to carry such debris over its top. The shaft 11 and crank 11ª may be of standard pipe fittings of proper size and length. The tail post 12 has a screw 12ª with which the holes in strap 13 may be engaged to retain the tail gate in proper position, in case it should be necessary at any time to remove the float 7 or the connecting arm 9.

The principal features of the invention are the intermittent rotation of the screen cylinder; increasing the efficiency of the screen cylinder by providing a means whereby the fish can escape into the stream instead of being carried over as they would be if the rotation was constant; maintaining an automatic water level; by the float, and tail gate and connecting lever; and the novel construction which permits of the removal of any or all parts of the moving or power members, without shutting off the flow of water.

What I claim is:

1. In combination, a screen, and means for rotating this screen; a tail gate and means for automatically varying the position of the gate according to the water level, substantially as described.

2. In combination, a cylindric screen, and means for rotating this screen intermittently; a tail gate, a float and connections for automatically varying the position of the gate, substantially as described.

3. In combination, a screen, a water wheel and connections whereby the water wheel operates the screen; a tail gate and means for automatically varying the position of the gate according to the water level, substantially as described.

4. In combination, a screen, a water wheel and connections whereby the water wheel operates the screen intermittently in a direction opposite to the rotation of the water wheel; a tail gate and means for automatically varying the position of the gate according to the water level, substantially as described.

5. In combination, a screen, a water wheel and connections whereby the water wheel operates the screen intermittently in a direction opposite to the rotation of the water wheel; a tail gate and a float and a lever connecting the gate and float for automatically varying the position of the gate according to the water level, substantially as described.

6. The combination of a chute, a rotating screen at one end of the chute, and means for causing said screen to rotate; a tail gate at the other end of the chute, and means connected with said tail gate for regulating the level of the water passing through the screen.

7. In a fish screening apparatus, the combination of a chute, a rotating screen at one end of the chute, and means for causing said screen to rotate in an upward direction at the side at which the water enters; a tail gate at the other end of the chute, and a float connected with said tail gate for regulating the level of the water passing through the screen.

8. In combination, a chute for the passage of water, a cylindric screen journaled transversely of said chute, a water wheel journaled in said chute; means whereby said wheel rotates the screen intermittently; a tail gate in said casing in rear of the water wheel, a lever connected with said tail gate, and a float connected to said lever for regulating the position of the tail gate.

9. In combination, a cylindric screen, a water wheel; a ratchet on the screen, a pawl engaging said ratchet, a crank on the water wheel, a pitman connecting said crank with said ratchet for operating the screen intermittently; a tail gate in rear of the water wheel, a lever connected with said tail gate, and means connected to said lever for regulating the position of the tail gate.

10. In a fish screen apparatus, the combination of a chute for the passage of water, a cylindric screen journaled in said chute, a water wheel journaled in said chute; a ratchet on the screen, a pawl engaging said ratchet, a crank on the water wheel, a pitman connecting said crank with said ratchet for operating the screen intermittently in a direction opposite to the direction of rotation of the water wheel; a tail gate in said chute in rear of the water wheel, a lever connected with said tail gate, and a float connected to said lever for regulating the position of the tail gate.

In testimony that I claim the foregoing as my own, I affix my signature in presence of two witnesses.

RALPH WALDO REQUA.

Witnesses:
W. L. GATCHELL,
GUY R. KENNEDY.

---

Copies of this patent may be obtained for five cents each, by addressing the "Commissioner of Patents, Washington, D. C."